June 21, 1938. W. H. KUEHN 2,121,090
HEATING APPARATUS FOR AUTOMOBILES
Filed May 29, 1937 4 Sheets-Sheet 4
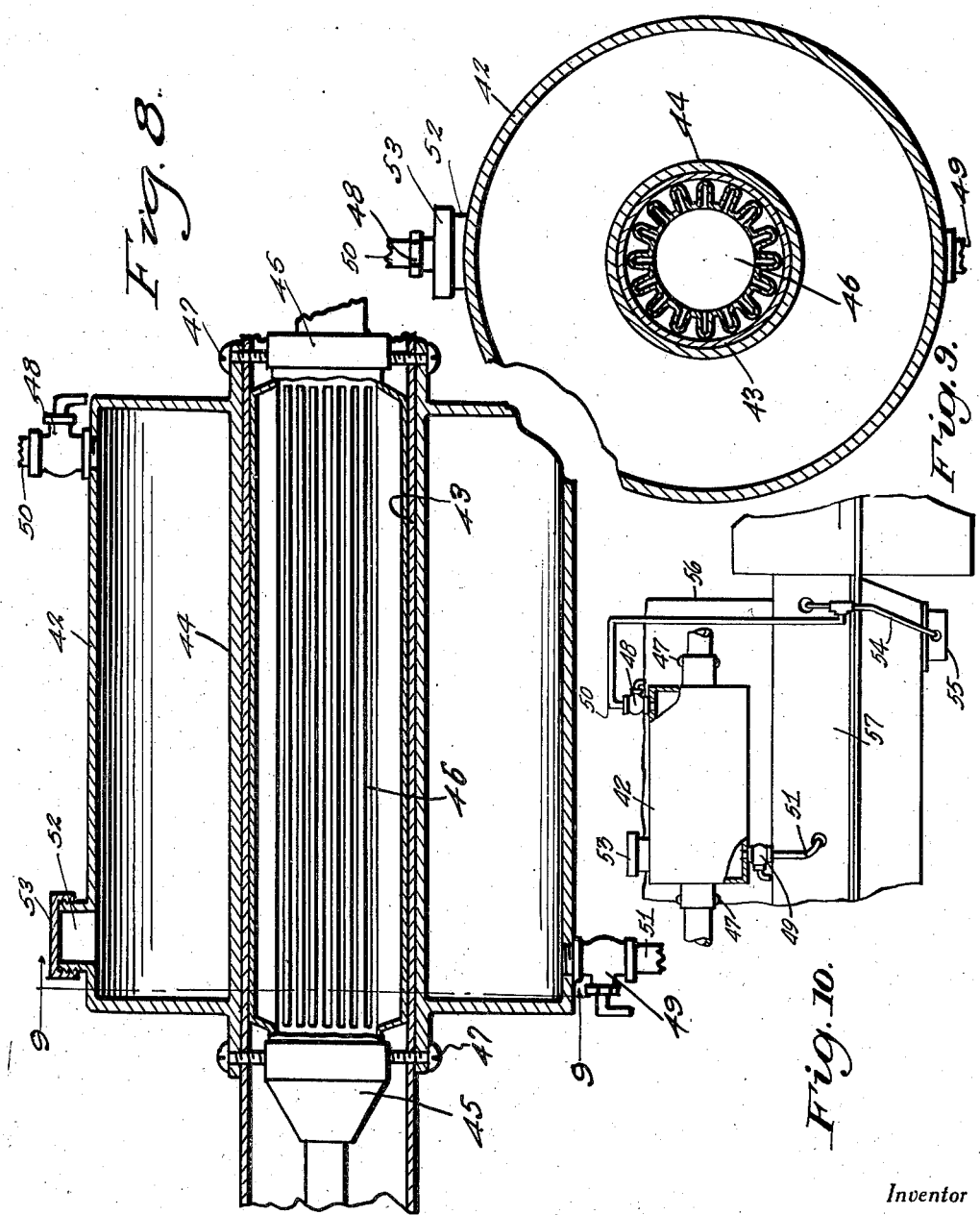
Inventor
Wilton H. Kuehn
By Clarence A. O'Brien
Hyman Berman
Attorneys Patented June 21, 1938

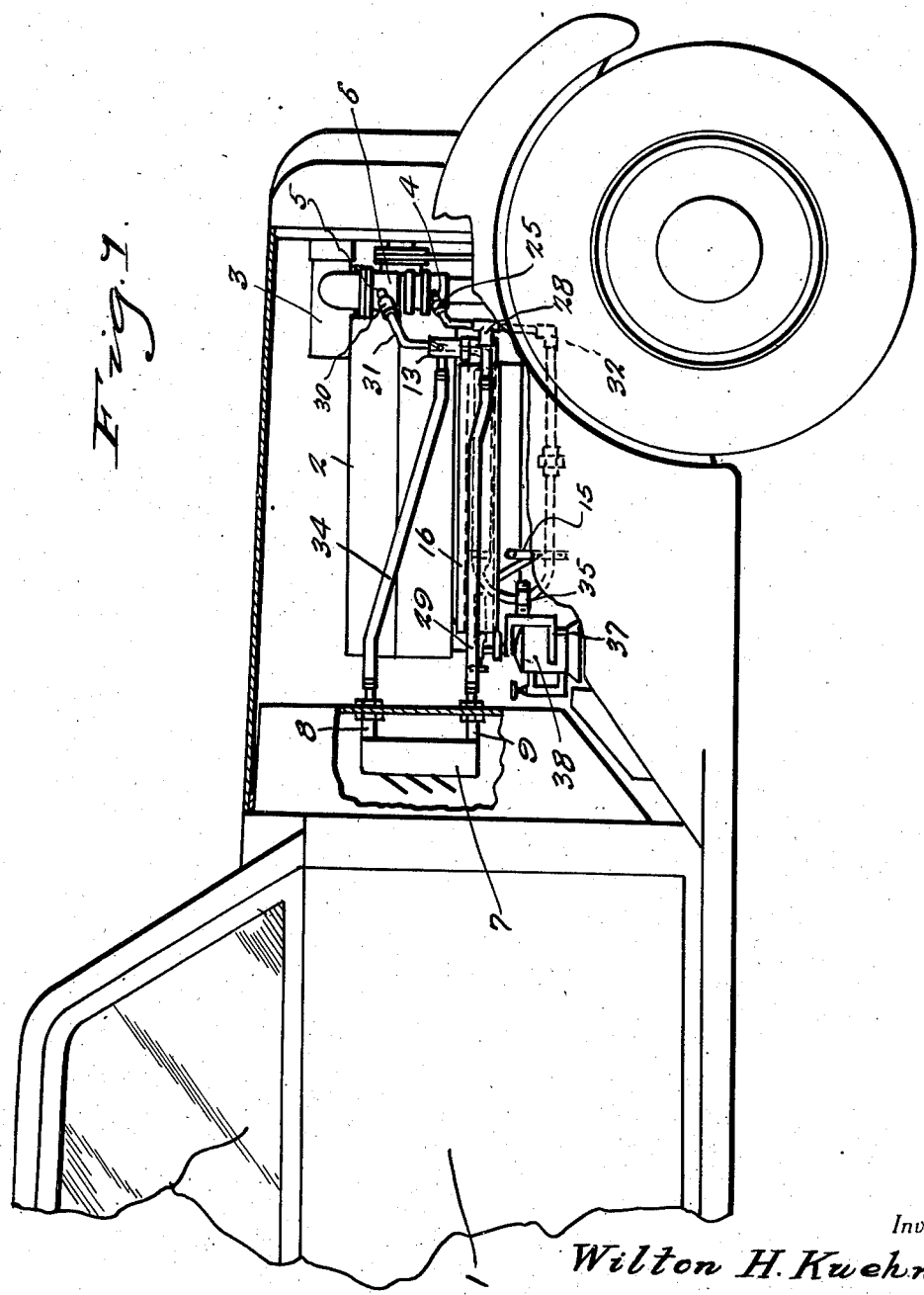

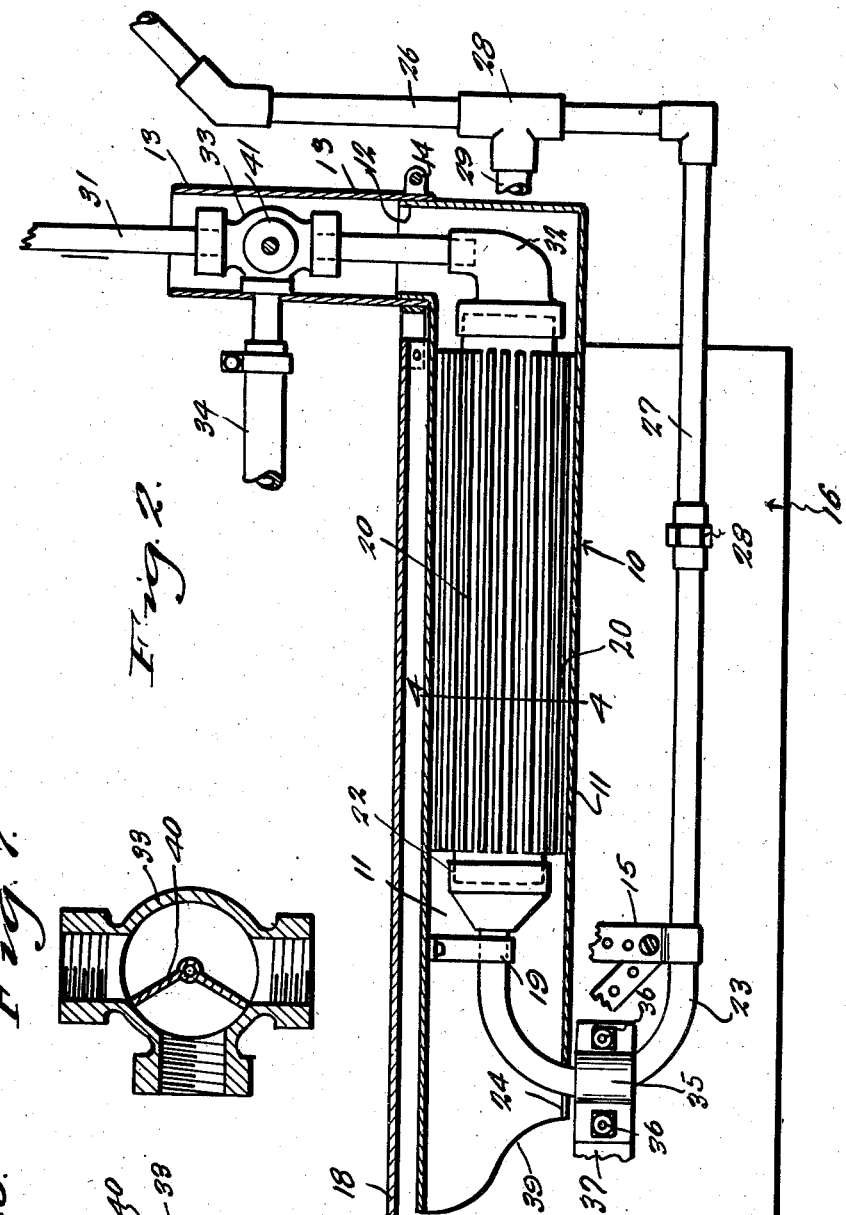
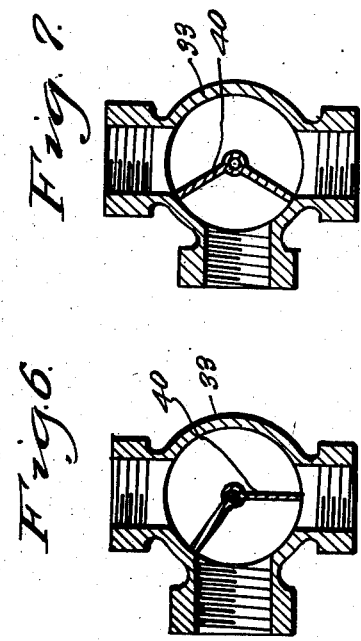

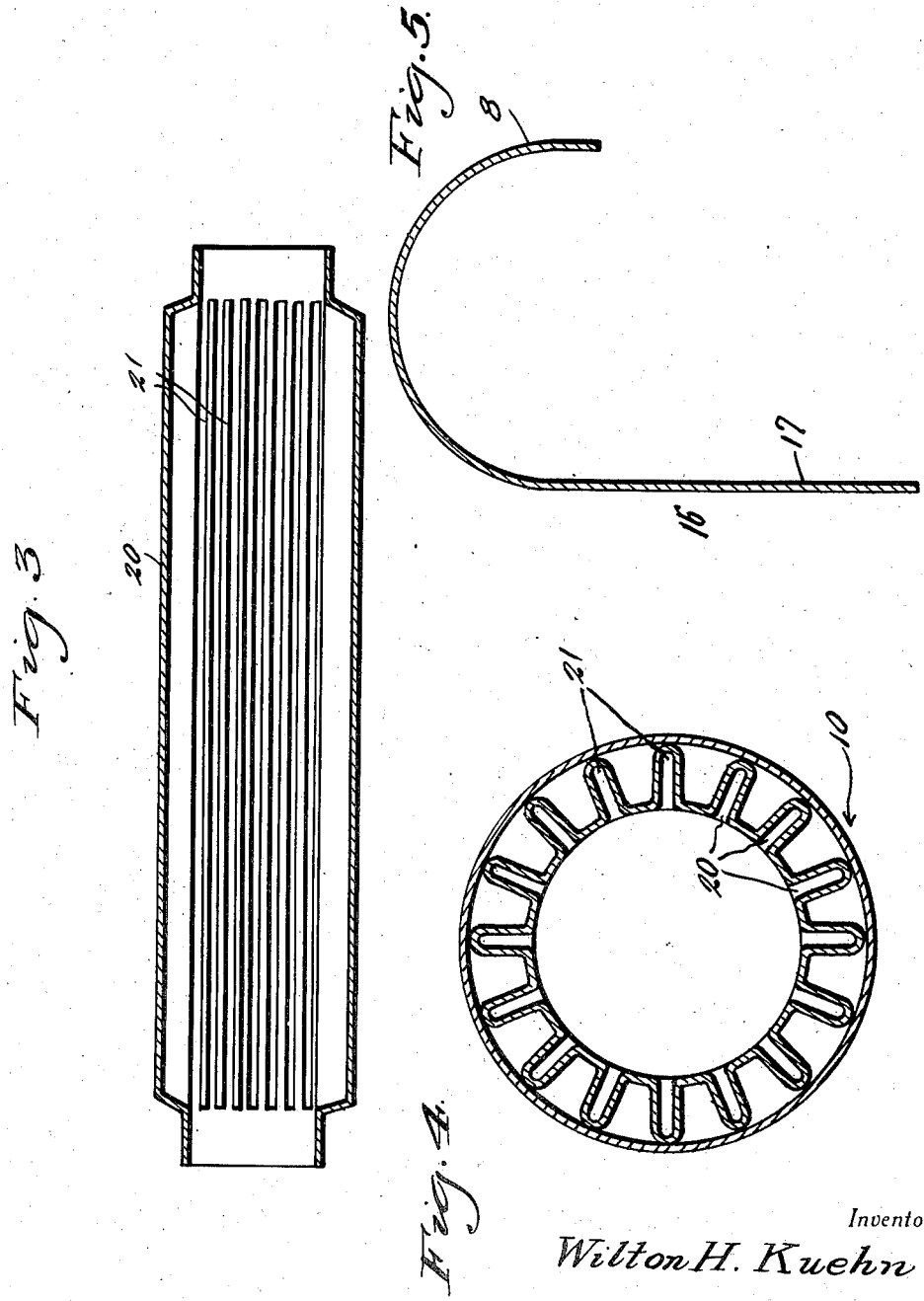

2,121,090

UNITED STATES PATENT OFFICE 2,121,090

HEATING APPARATUS FOR AUTOMOBILES

Wilton H. Kuehn, Hebron, N. Dak.

Application May 29, 1937, Serial No. 145,603

5 Claims. (Cl. 123—170)

My invention relates to improvements in heating apparatus for automobiles, and more particularly to apparatus for heating either the cooling fluid of the engine of an automobile or the interior of the car as desired.

The primary object of my invention is to provide a heating apparatus of simple construction, and compact arrangement, for attachment to any type of automobile as a permanent part thereof for heating the cooling fluid of the engine in extremes of weather prior to starting the engine to thereby facilitate such starting, and adapted for also heating the interior of the automobile when the engine is not running.

Other objects are to provide apparatus for the purpose above set forth which is highly efficient in operation, obviates danger from poison gas, or fire, is inexpensive to manufacture, and can readily be installed without alteration or modification of the standard equipment of automobiles.

Other and subordinate objects are also comprehended by my invention, all of which together with the exact nature of my improvements, will become apparent when the following description and claims are read with reference to the drawings, accompanying and forming part of this specification.

In said drawings:—

Figure 1 is a fragmentary view partly in longitudinal section and partly in side elevation of an automobile equipped according to my invention.

Figure 2 is a detail view partly in longitudinal vertical section and partly in side elevation illustrating a heating cylinder forming part of the apparatus, a heat conducting flue in which said cylinder is located, a protective hood extending between the flue and the automobile engine, a control valve and parts of the pipe line connecting the heating cylinder in circuit with the cooling system of the automobile engine and the car heater respectively.

Figure 3 is a view in longitudinal section of the heating cylinder.

Figure 4 is a view in transverse section taken on the line 4—4 of Figure 2, and drawn to an enlarged scale.

Figure 5 is a similar view of the protective hood.

Figure 6 is a view in transverse section of the control valve illustrating the position of the valve member when said member is turned to direct the heat into the car heater.

Figure 7 is a similar view illustrating the valve member proper positioned to heat the cooling system of the engine.

Figure 8 is a view in longitudinal section of a modification of the invention for heating lubricating oil of the engine.

Figure 9 is a view in transverse section taken on the line 9—9 of Figure 8 looking in the direction indicated by the arrows.

Figure 10 is a diagrammatic view in side elevation illustrating the application of the modified form of the invention.

Referring to the drawings by numerals, a preferred embodiment of my invention has been illustrated in Figures 1 to 7 as forming part of the equipment of an automobile, conventionally shown, 1 designating the body, 2 the engine, and 3 a well-known adjunctive unit of the fluid cooling system of the engine including, in this instance, a lower tap 4 adapted to discharge fluid from the system, and an upper tap 5 for returning fluid thereto, said unit being located at the upper front part of the engine. As will be understood the designated taps 4 and 5 are related to opposite sides of a water pump forming part of the unit and represented at 6. The numeral 7 designates the usual car heater, conventionally shown, attached to the dashboard by the usual connections represented at 8 and 9 respectively.

Coming now to my invention, alongside the lower part of the engine 2 is a heat conducting conduit 10 of cylindrical form comprising a horizontally disposed section 11 having an open rear end, a closed front end, a nipple 12 projecting upwardly from its front end, and a vertical section 13 fitted onto said nipple 12. The conduit 10 may be affixed to the engine 2, as desired, but is preferably connected horizontally to the unit 3 in a suspended manner as will presently appear. The conduit 10 may be formed of any suitable material and constitutes a flue for a purpose presently stated. Between the conduit 10 and the engine 2 is a protective hood, or guard, 16, comprising a rear vertical wall 17 extending well below said conduit, and an upper forwardly projecting flange 18 curving over said conduit 10. The hood 16 extends to the rear end of the conduit 10 for a purpose presently seen. At its front end said hood 16 is suspended from the conduit 10 by a clamping bracket indicated at 14. Adjacent its rear end said hood is suspended by a suitable form of adjustable bracket 15 from a pipeline, presently described, and which serves to suspend one end of the conduit 10 as by a suitably arranged bracket 19. The bracket 15 may be attached to the engine 2 also, in any suitable manner to support the heater against vibration.

Fitted in the front part of the conduit section 11 is an elongated heating cylinder 20 provided with horizontally extending ribs or fins 21 for increasing the area of surface exposed to the action of heat passing through the conduit 10. Connected to the rear end of the cylinder 20, by a reducer coupling 22, is a relatively smaller gooseneck pipe section 23 depending through and seated in a notch 24 in the rear end of said section 11 and extending forwardly below said sections. Projecting obliquely downward from the tap 4, as by a coupling 25, is a depending pipe assembly including an upright section 26 and a rearwardly extending horizontal lower section 27 connected by a coupling 28 to the forward extension of the gooseneck section 23. As will be understood, the pipe assembly 26, 27, and the gooseneck section 23 form an inlet pipeline for the discharge of fluid from the unit 3 into the rear end of the heating cylinder 20 and which together with the described relation of the gooseneck section 23 and the notch 24 to provide for suspending the rear end of said cylinder 20 in the conduit section 11. Connected to the upright section 26 of the described pipe assembly, by a T-coupling 28, is a pipe section 29 leading to the bottom of the car heater 7. The pipe section 29 is a discharge pipe from the heater 7 as will presently more clearly appear. Suspended from the upper tap 5, by a coupling 30, is an outlet pipeline 31 extending into the conduit section 13 and connected to the front end of the heating cylinder 20 by a reducer coupling 32. As will be manifest, the pipe line 31 suspends the front end of the heating cylinder 20 from the top 5. Interposed in the pipeline 31 within the conduit section 13 is a two-way control valve 33. An intake, or feed pipe 34, extends from one side of said valve 33 through the conduit section 13 to the top of the car heater 7. As will now be seen, the front end of the conduit section 11 is also suspended by the pipe line 31 from the tap 5 and by the said feed pipe 34.

Clamped to the gooseneck section 23, at the rear end thereof, as by the clip 35 and bolt 36, is a bracket 37 of suitable construction for supporting a blow torch 38 directly under a cut out 39 in the rear end of the conduit section 11 whereby the flame of said torch is located within said end of said section.

Suitably mounted in the valve 33 is a two-blade valve member 40 manipulative by a hand wheel 41, extending exteriorly of the conduit section 13, into two different positions illustrated in Figures 6 and 7 respectively. In one of said positions, that shown in Figure 6, fluid rising in the pipe line 31 is directed into the inlet or feed pipe 34 of the heater. In the other position of said member 40, that shown in Figure 7, the valve 33 is opened to the pipe line 31 for the free flow of fluid therethrough to the tap 5.

Coming now to the operation of the described form of my invention, as will be understood, the described pipe lines and sections 26, 27, 29, 23, 31, and 34, together with the heating cylinder 20 are always filled with fluid from the cooling system, likewise the heater 7.

When it is desired to warm up the engine 2 preparatory to starting, the valve member 40 is rotated to the position illustrated in Figure 7 and the torch 38 lighted. The heat from the torch circulates through the heat conducting conduit 10 thereby heating the fluid in said cylinder 20 and in the pipe parts housed in said conduit. The heated fluid rises through the open valve 33 into the tap 5 and cooling system thereby setting up a siphoning action through the heating apparatus.

When it is desired to heat the car without starting the engine 2, the valve member 40 is rotated into position shown in Figure 6 and the torch 38 lighted. In this position of the valve member 40 a sufficient flow of heated fluid through the valve 33 and pipeline 31 is obtained to set up the before mentioned siphoning action. However, the major flow of fluid from the heating cylinder 20 is through the valve 33 to the car heater 7 by way of pipe section 34, through the heater 7 and back to inlet pipe 26 by way of discharge pipe 29 and sections 27 and 23 to the heating cylinder 20. As will be manifest, after the engine 2 is started, the valve member 40 being set in the Figure 7 position, the fluid is circulated under the action of the fluid or water pump 6 to the heater 7 and the car heated by the hot fluid from the cooling system.

In the modification of the invention shown in Figure 8 or 9, a drum 42, for heating oil, is fitted over a conduit 43, similar to conduit 10, and by means of an axial sleeve 44 therein extending beyond the ends of said drum and secured to reducer couplings 45 on opposite ends of a heating cylinder 46 by means of screws 47 passing through the extensions of said sleeve 44 and said conduit 43. The drum 42 is centered over the cylinder 46. The latter is similar to heating cylinder 20 and fitted snugly into the conduit 43 to disseminate heat through the latter and the sleeve 44 into the drum 42. A pair of inlet and outlet petcocks 48 and 49 are connected to opposite top and bottom ends of the drum 42 respectively. Pipes indicated at 50 and 51 suitably connect said petcocks 48 and 49 with the oil circulating system of the engine 2 so that oil will be circulated through said drum 42 when said petcocks 48 and 49 are opened. As shown in Figure 10, the pipe 50 may be connected in the line of connection 54 between the oil pump 55 of the engine 56 and the crank case 57, whereas, the pipe 51 may be connected to the crank case 57. In this form of the invention, the oil in the engine is warmed at the same time as the cooling fluid in order to facilitate starting of the engine.

In the operation of the modified form of the invention, the inlet petcock 48 is opened and the outlet petcock 49 closed prior to stopping the engine until the oil containing drum 42 is filled with oil. This condition may be ascertained by way of a drain nipple 52 on said drum 42 covered by a screw cap 53. The heating cylinder 46 is heated in practically the same manner and by the same means as described with reference to the preferred form of the invention. When the oil in the drum 42 is sufficiently heated, the petcock 49 is opened to permit the oil to flow from the drum back into the oil circulating system. It is to be understood that the heating of the oil in the drum 42 may be accomplished after the engine has stopped running and said oil introduced to the circulating system while the engine is cold for instance when the machine has been left standing in cold weather.

The foregoing constitutes a detailed description of a preferred embodiment of my invention, and one modification thereof, and it is believed that the operation, construction and advantages of the invention will be clearly understood therefrom without further explanation.

Manifestly, the invention is susceptible of modification in other respects than as described and right is herein reserved to all such modifications falling within the scope of the claims appended hereto.

What I claim is:—

1. Heating apparatus for use in connection with the water cooling system of an automobile engine and comprising an elongated heating cylinder having closed ends and for location alongside said engine, inlet and outlet pipe lines extending from opposite ends of the cylinder, respectively, for connecting the cylinder in the water cooling system for circulation of water therethrough, a cylindrical heat conducting jacket surrounding said cylinder, said jacket being open at both ends and extending at one end beyond the cylinder, and a torchlike heat generating unit at the extending end of the jacket for introducing heat into said end.

2. Heating apparatus for use in connection with the water cooling system of an automobile engine and comprising an elongated heating cylinder having closed ends and for location alongside said engine, inlet and outlet pipe lines extending from opposite ends of the cylinder, respectively, for connecting the cylinder in the water cooling system for circulation of water therethrough, a cylindrical heat conducting jacket surrounding said cylinder, said jacket being open at both ends and extending at one end beyond the cylinder, a torchlike heat generating unit at the extending end of the jacket for introducing heat into said end, and a guard extending over the top of the jacket and below the same on one side thereof.

3. Heating apparatus for use in connection with the water cooling system of an automobile engine and comprising an elongated heating cylinder having closed ends and for location alongside said engine, inlet and outlet pipe lines extending from opposite ends of the cylinder, respectively, for connecting the cylinder in the water cooling system for circulation of water therethrough, a cylindrical heat conducting jacket surrounding said cylinder, said jacket being open at both ends and extending at one end beyond the cylinder, and a torchlike heat generating unit at the extending end of the jacket for introducing heat into said end, said cylinder having hollow exterior ribs extending longitudinally thereof and fitting snugly in said jacket.

4. Heating apparatus for use in connection with the water cooling system of an automobile engine and comprising an elongated heating cylinder having closed ends and for location horizontally alongside said engine, inlet and outlet pipe lines extending from opposite ends of the cylinder, respectively, for connecting the cylinder in the water cooling system for circulation of water through said cylinder, a cylindrical heat conducting jacket surrounding the cylinder, said jacket being opened at both ends and extending at one end beyond the cylinder, the extending end being undercut to form a hood, and a torchlike heat generating unit disposed below said hood.

5. Heating apparatus for use in connection with the water cooling and lubricating systems of an automobile engine and comprising a heating cylinder for location alongside the engine and having inlet and outlet ends, respectively, inlet and outlet pipe lines extending from said ends, respectively, for connection in said cooling system to provide for circulation of water through the cylinder, means for heating said cylinder at will, and a drum surrounding said cylinder and having inlet and outlet pipe lines extending therefrom for connection to the engine to provide for circulation of the lubricating fluid from the engine through said drum.

WILTON H. KUEHN.